UNITED STATES PATENT OFFICE.

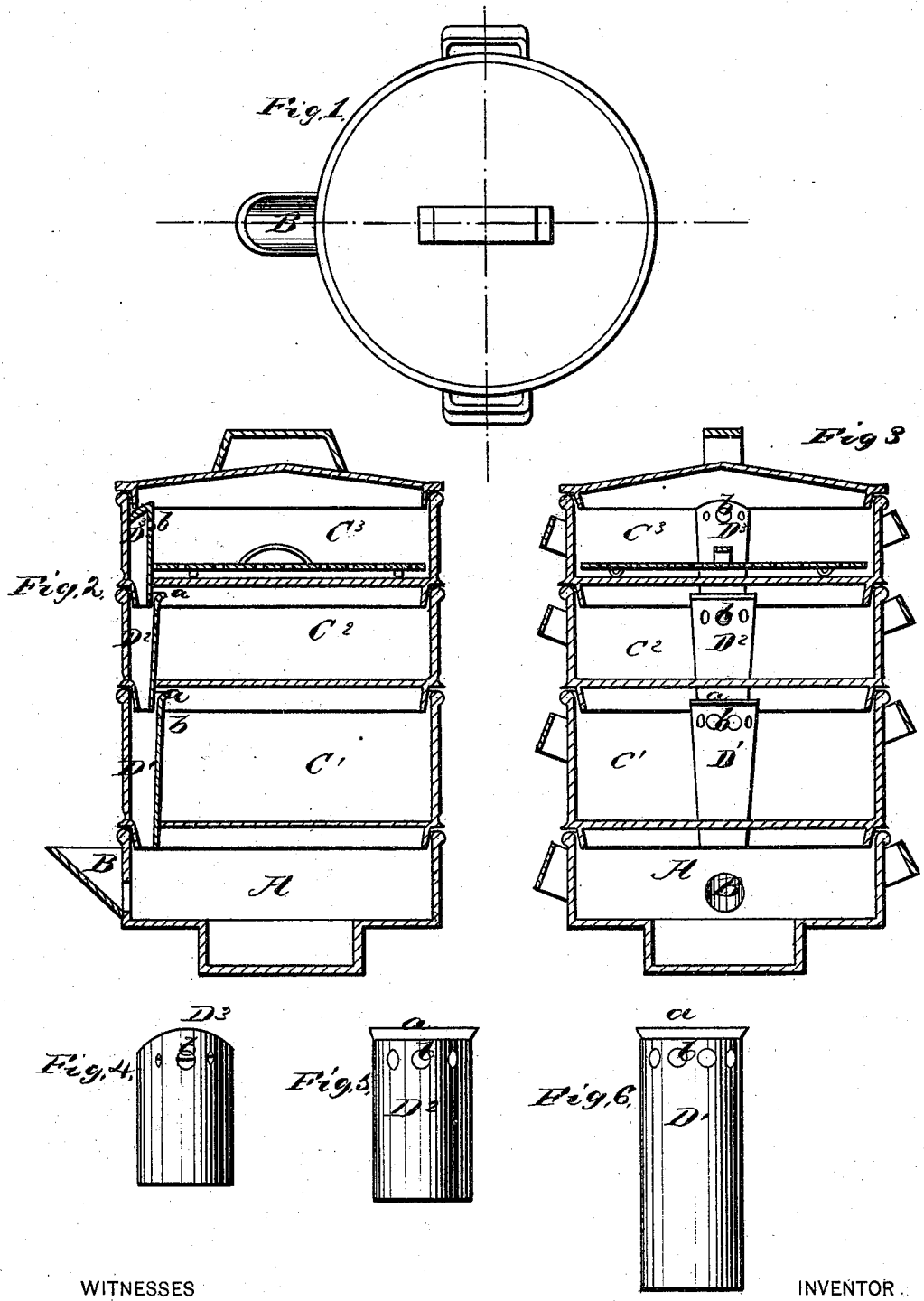

WILLARD F. GUERNSEY, OF KALAMAZOO, MICHIGAN.

IMPROVEMENT IN STEAM-COOKERS.

Specification forming part of Letters Patent No. 177,828, dated May 23, 1876; application filed April 1, 1876.

*To all whom it may concern:*

Be it known that I, WILLARD F. GUERNSEY, of Kalamazoo, in the county of Kalamazoo, and State of Michigan, have invented a new and valuable Improvement in Steam-Cookers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my steam-cooker, and Figs. 2 and 3 are vertical sections of the same. Figs. 4, 5, and 6 are detail views thereof.

My invention relates to that class of steam-cookers in which a series of vessels are used, one on top of another, the bottom vessel forming the boiler, and the upper vessels containing the articles to be cooked; and the nature of my invention consists in the construction and arrangement of the parts, as will be hereinafter more fully set forth.

In the annexed drawings, A represents the lower vessel or boiler, made of any suitable size and form, and provided with a spout, B, for supplying water when necessary.

$C^1$ $C^2$ $C^3$ represent vessels placed on top of the boiler A, as shown, and fitting into each other tolerably close by a hoop, rim, or flange. Each of these vessels or sections is provided with a flue or tube marked, respectively, $D^1$ $D^2$ $D^3$, and so connected as to form one continuous tube, flue, or pipe opening into or connecting with boiler. The tube-sections $D^1$ $D^2$ have each at the upper end a shoulder, $a$, formed on an inward incline of about forty-five degrees, and which receives the projecting tube from above, and supports the same, leaving abundant space behind it to arrest and collect all drippings of condensing steam that form on or near the tube above, and conducts them safely down the inside of the tube to the boiler. In the upper end of each tube-section are holes $b$, punched inward into the tube, so that the ridge or burr formed by the punch diverts the dripping fluid from the holes on its descent to the boiler. The projecting tube, resting on the lower edge of the shoulder, leaves opening enough for the escape of this fluid into the tube to descend to the boiler. The tube $D^3$ in the vessel $C^3$ has no shoulder, unless another section is added, but is closed at the end at an angle of forty-five degrees upward from the outside of the vessel to make more room to place the holes $b$ higher. The closing of this tube stops the upward draft of steam and forces it to enter the several sections by the holes $b$.

By experiments I have found that to evenly distribute the steam in the several vessels the apertures for the steam should be diminished from the bottom upward either in size or number—that is to say, the pipes $D^1$ should have larger area for the escape of steam into the vessel $C^1$. Then the pipe $D^2$ and this latter should be larger than the one above it.

By this construction the device acts uniformly, and there is no mixing of flavors in any manner.

What I claim as new, and desire to secure by Letters Patent, is—

The sections $C^1$ $C^2$, provided with tubes $D^1$ $D^2$, having flaring shoulders $a$, in combination with the section $C^3$, provided with a tube, $D^3$, closed at its upper end, and having perforations $b$, and section A, substantially as and for the purpose set forth.

In testimony that I claim the above I have hereunto subscribed my name in the presence of two witnesses.

WILLARD FULLER GUERNSEY.

Witnesses:
J. H. BOSTWICK,
HENRY W. BUSH.